Feb. 1, 1955 V. ETEM 2,700,863
LAWN CLEANING MACHINE
Filed Sept. 2, 1949 4 Sheets-Sheet 1
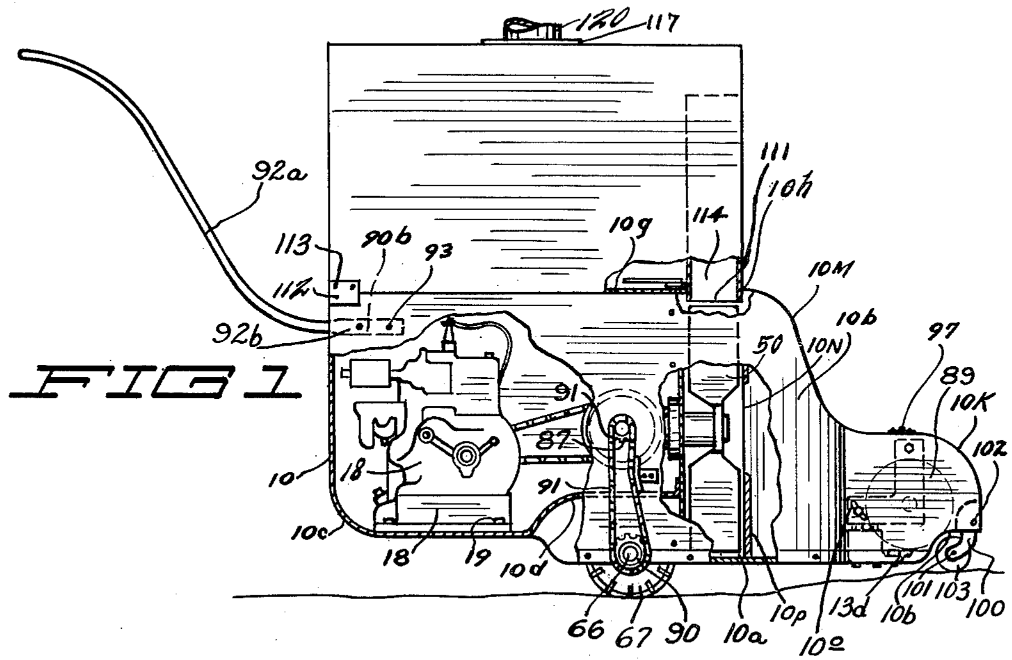
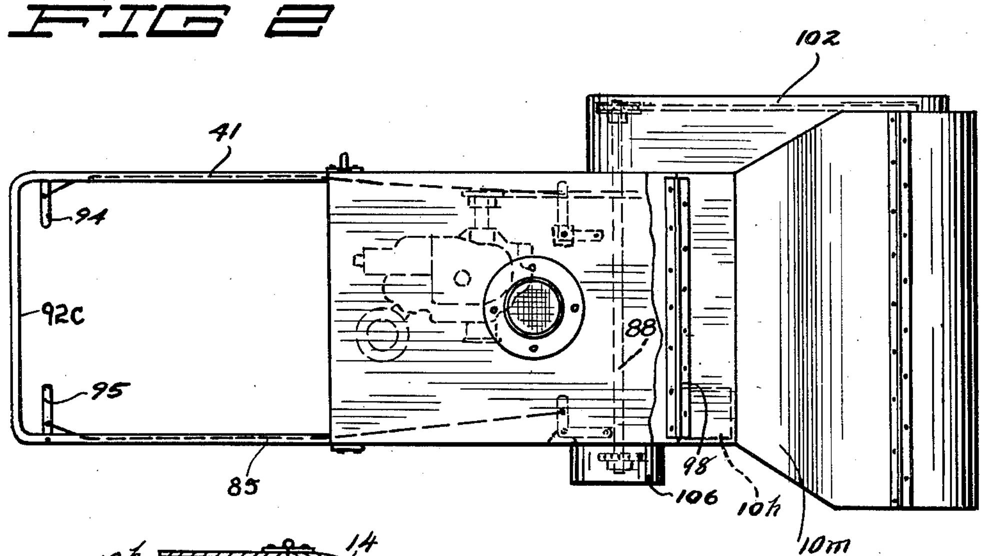
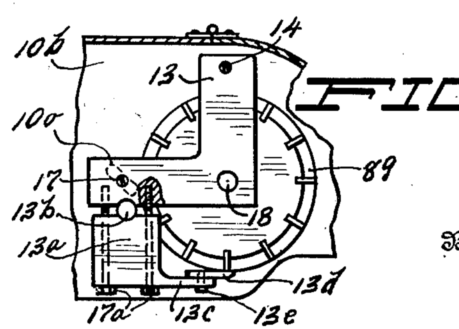
Inventor
VICTOR ETEM
By Chas. C. Reif
ATTORNEY LAWN CLEANING MACHINE
Filed Sept. 2, 1949 4 Sheets-Sheet 2
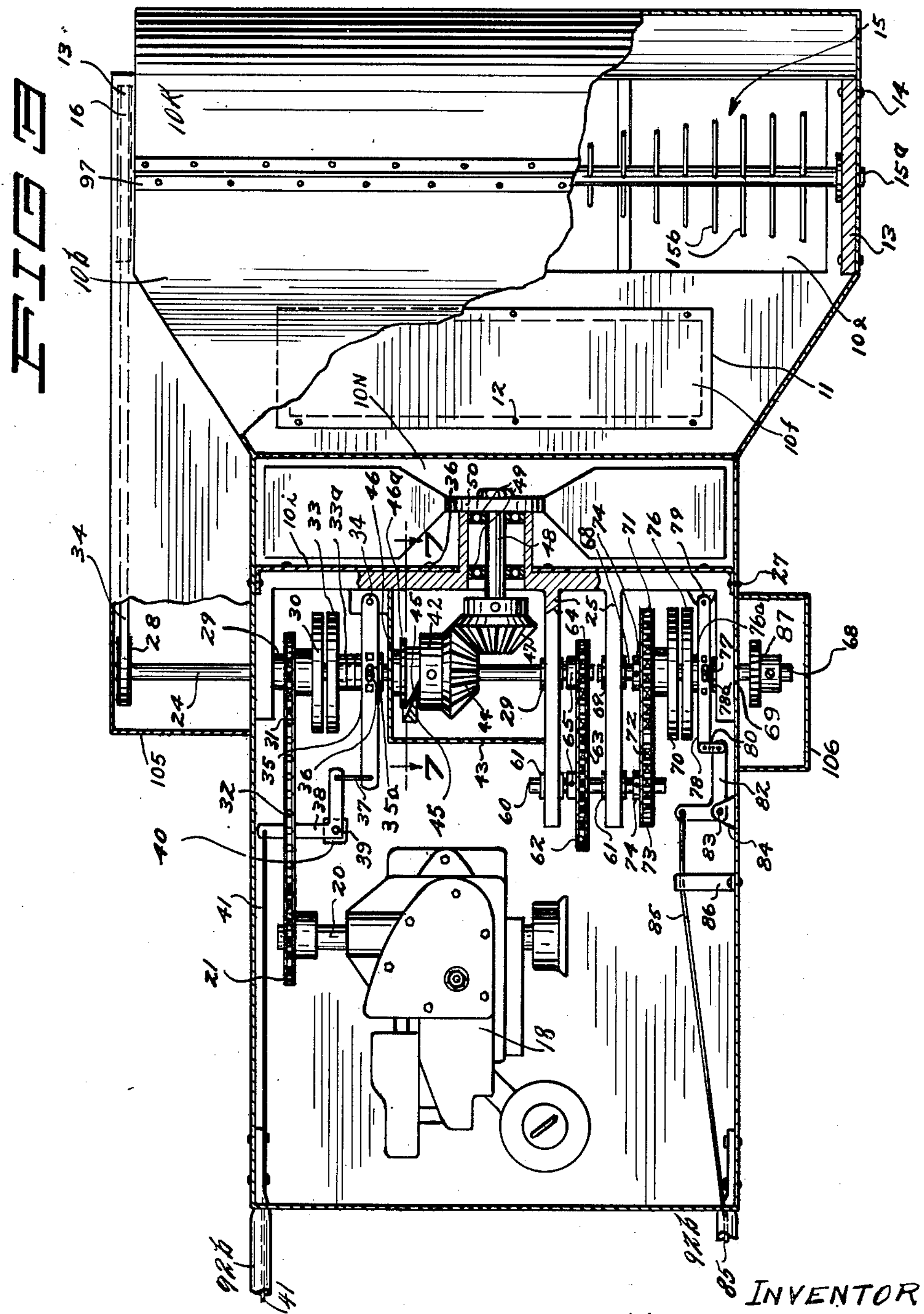
INVENTOR
VICTOR ETEM
BY Chas. C. Reif
ATTORNEY Feb. 1, 1955 V. ETEM 2,700,863
LAWN CLEANING MACHINE
Filed Sept. 2, 1949 4 Sheets-Sheet 3
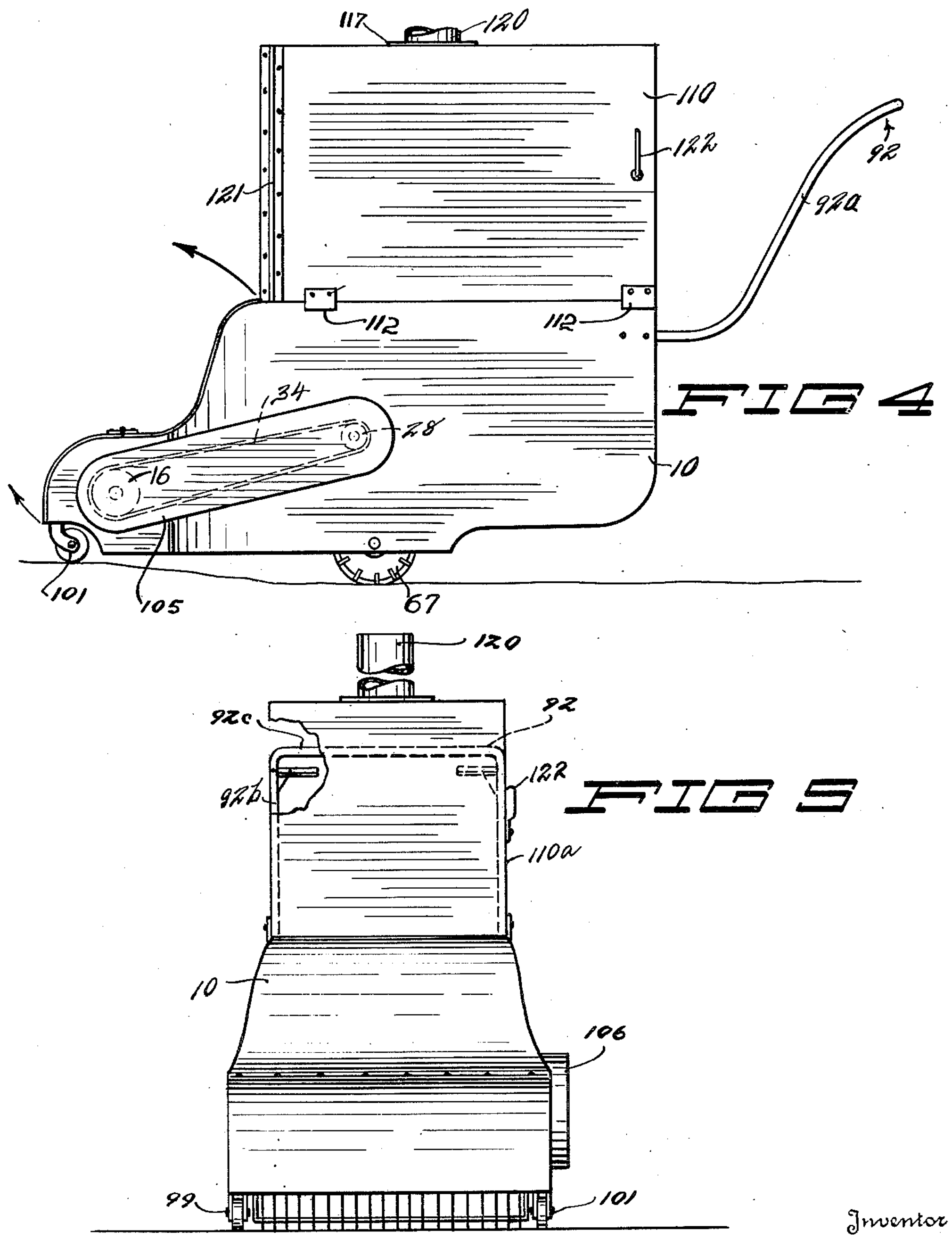
Inventor
VICTOR ETEM
By Chas. C. Reif
ATTORNEY Feb. 1, 1955 V. ETEM 2,700,863
LAWN CLEANING MACHINE
Filed Sept. 2, 1949 4 Sheets-Sheet 4
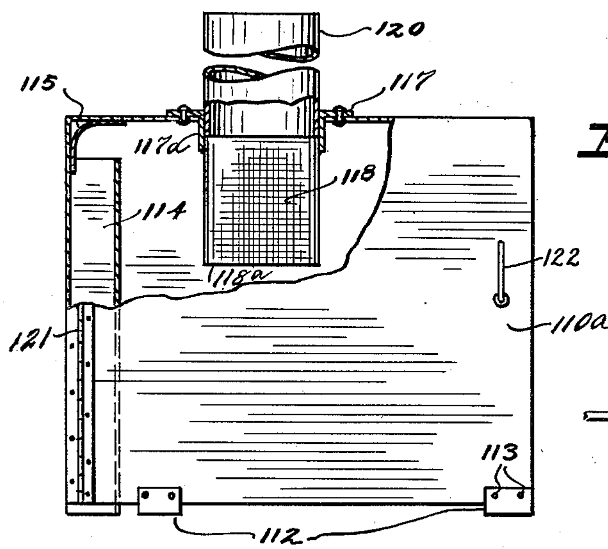
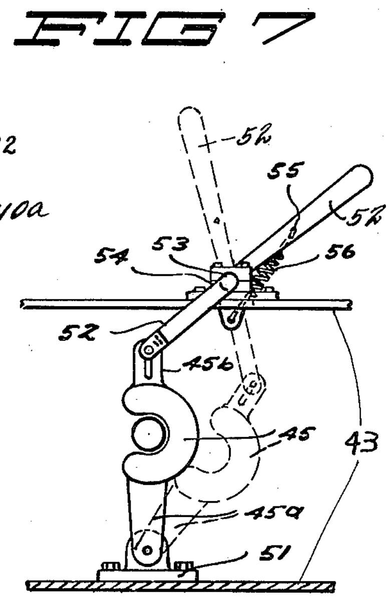
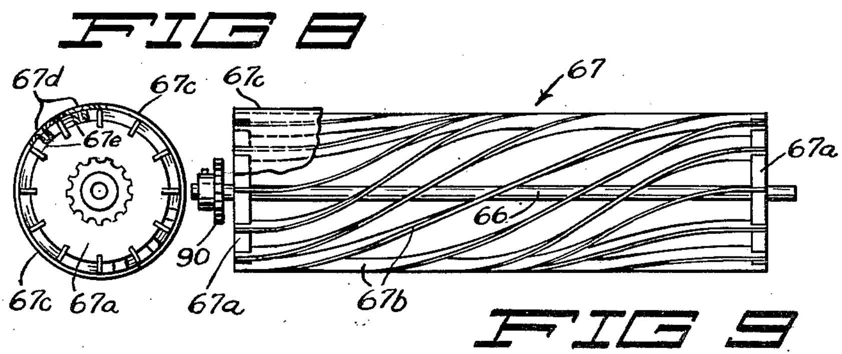
Inventor
VICTOR ETEM
By Chas. C. Reif
ATTORNEY

United States Patent Office 2,700,863

Patented Feb. 1, 1955

1

2,700,863

LAWN CLEANING MACHINE

Victor Etem, Minneapolis, Minn.

Application September 2, 1949, Serial No. 113,888

2 Claims. (Cl. 56—27)

This invention relates to a machine comprising a casing mounted on wheels or a roller and adapted to be moved over the ground for moving material supported on the ground. Such material might be leaves, twigs and similar matter, grass clippings or snow. While the device is adapted to move all of said materials with very slight modifications, in the embodiment of the invention illustrated the machine is shown as constructed and arranged to move and gather leaves, twigs and such similar material on the ground.

It is an object of this invention to provide a machine for moving and gathering material supported on the ground comprising a casing having supporting wheels or roller and which may be readily moved over the ground, the same preferably having handles at the rear thereof adapted to be held by the operator, said casing having a motor mounted therein, said casing comprising a fan chamber with a fan therein and with inlet and outlet openings and a front portion communicating with said inlet opening, said front portion having an opening at its lower side adjacent the ground and a rotatable member mounted in said front portion and driven from said motor for moving said material together with a second casing mounted on said first mentioned casing and communicating with said outlet opening, said material being thus delivered to said second casing.

It is another object of the invention to provide such a device as set forth in the preceding paragraph, together with means disposed in said casing for driving said rotatable member, means for controlling the driving of said member, means in said casing for driving said wheels or roller, and means for controlling the driving of said wheels or roller, means also being provided in said casing for driving said fan and controlling the driving thereof.

It is a further object of the invention to provide a device comprising a box-like casing, said casing comprising a fan chamber with inlet and outlet openings and a front portion communicating with said inlet opening and having an opening at its lower side adjacent the ground, a roller intermediate the ends of said casing for supporting the same, a rotatable member in said front portion which may comprise a brush having radially extending wire-like members, a motor mounted in the rear of said casing, a shaft journaled in said casing, means for driving said shaft from said motor, means for controlling the driving of said shaft, means for driving said fan from said shaft, means for controlling the driving of said fan, a counter-shaft journaled in said casing driven from said first mentioned shaft, a third shaft journaled in said casing driven from said counter-shaft, means for controlling the driving of said third shaft, means for driving said roller from said third shaft, and means for driving said rotatable member from said first mentioned shaft.

It is still further an object of this invention to provide a device as set forth in the preceding paragraph, together with handle means secured to the rear of said casing and extending rearwardly therefrom, said means for controlling the driving of said first mentioned shaft including control members carried on said handle means, said means for controlling said third shaft including a member supported on said handle means.

It is also a further object of the invention to provide such a device as set forth in the preceding paragraph save one in which said first mentioned shaft projects through one side of said casing and has a pulley adjacent the end thereof, said rotatable member having a pulley secured thereto and a belt connecting said pulleys.

It is still another object of the invention to provide such a device as set forth in the preceding paragraph save two in which said third shaft projects at one side of said casing, a sprocket secured at the end of said third shaft outside of said casing, said roller having a supporting shaft, and means extending from said sprocket to said last mentioned shaft for driving said roller.

These and other objects and advantages of the invention will be fully set forth in the following description made in connection with the accompanying drawings in which line reference characters refer to similar parts throughout the several views and in which:

Fig. 1 is a view in side elevation of the device of this invention, some parts being broken away;

Fig. 2 is a top plan view of the device, some parts being indicated in dotted lines;

Fig. 3 is a plan view of the device on an enlarged scale, some parts being broken away and other parts being shown in horizontal section;

Fig. 4 is a view in side elevation as seen from the side opposite to that seen in Fig. 1;

Fig. 5 is a view in front elevation of said device;

Fig. 6 is an enlarged view in side elevation of the hopper used on the device with some parts being broken away and a part shown in dotted lines;

Fig. 7 is a view in side elevation on an enlarged scale taken on line 7—7 as shown in Fig. 3 extending in the direction of the arrows;

Fig. 8 is a view in end elevation of the roller used in the device;

Fig. 9 is a view in side elevation of the roller used in the device with a sprocket attached, and Fig. 10 is a view in end elevation of the cutter blade and its support, the casing and part of the support being shown in vertical section taken substantially on line 10—10 of Fig. 2, as indicated by the arrows.

Referring to the drawings, a device is shown comprising a casing 10. While this casing might be made in various forms, in the embodiment of the invention illustrated it is shown as of general box-like form, the same being substantially rectangular in horizontal and vertical cross section. Said casing has an intermediate portion **10*p* forming a fan chamber 10*a*, said fan chamber having an inlet opening 10*n* and said casing has a front portion 10*b* the bottom of which is substantially horizontal but the top of which, comprises a cover, is curved and extends downwardly and forwardly. Said front portion has a substantially horizontal bottom but the same has an opening 10*e* of substantially rectangular form therein adjacent its front. Said bottom also has an opening 10*f* somewhat smaller than opening 10*e*, the same also being of rectangular form. Opening 10*f* is provided with a cover 11 which is held by a plurality of screws 12 and which may be readily removed. The rear bottom corner 10*c* is shown as of curved form and the casing has a raised bottom portion 10*d* immediate the ends thereof extending over a supporting roller and forming in effect a fender. The top 10*g* of casing 10 is substantially horizontal and is provided with a substantially square discharge or outlet opening 10*h* above fan chamber 10*a*. Said cover 10*g* is divided close to the rear side of opening 10*h* and a suitably supported hinge 98 extends across the same. The portion at the front of hinge 98 can swing through 180 degrees on said hinge 98, as indicated in Fig. 1. Opening 10*h* would then be exposed. The portion of cover 10*g* in the rear of hinge 98 can also swing upwardly about hinge 98 to give access to casing 10. Plates 13 are preferably of angular shape, as shown in Fig. 10, and are secured to the inner side of the vertical side walls of front portion 10*b*. Said plates are secured by a bolt 14 at one end and by another bolt 17 adjacent their other ends. Rod 88 passes through said plates adjacent the center thereof. Slots 10*o* are formed in the end walls of portion 10*b* through which bolts 17 respectively pass. A block or bracket 13*a* is secured to the lower side of each plate 13 by spaced headed bolts 17*a*. Plate 13 and bracket 13*a* are provided with semi-cylindrical grooves in their adjacent sides in which fits a pin 13*b* disposed between and spacing members 13 and 13*a*. Member 13*a* has a forwardly projecting portion 13*c* to which is connected a cutter bar 13*d* extending transversely of the device beneath the rotating member 89. Bar 13*d* is secured by a plurality of headed bolts 13*e***.

When applicant's device is used as a lawn mower, member 89 will be used and will constitute a rotating cutter such as is used on a common type of lawn mower and will cooperate with bar **13*d*, which latter bar will be sharpened at its forward edge. Said bar can be adjusted vertically by moving outward one of the screws 17*a*. Plates 13 can be swung about their bolts 14 when bolts 14 and 17 are loosened to tighten the V-belt or chain 34. When said chain is under the desired tension, said bolts will again be tightened. A rotatable member 15 constituting a rotating rake is provided to be used when applicant's device is used for gathering material, which, in the embodiment of the invention illustrated, comprises a central shaft 15*a* which is journaled in the plates 13 and sides of casing 10, one end of said shaft being provided with a pulley 16. Member 15 also comprises a plurality of sets of radially extending wire-like teeth 15*b*** arranged in helically extending rows.

A motor 18 is provided and mounted in the rear of casing 10. Said motor is shown as an internal combustion motor, the base of which has flanges connected by bolts 19 to the bottom of casing 10. Said motor has a driving shaft 20 provided with a sprocket 21. A shaft 24 is provided, the same being journaled in a bearing bracket 25 secured to casing 10 and specifically to the rear partition **10*i* of fan chamber 10*a*. Said bracket is secured by a plurality of bolts or rivets 26 extending therethrough and said partition. Partition 10*i* is shown as having end flanges secured to the sides of casing 10 by rivets or bolts 27. Bracket 25 will preferably be provided with ball bearings 29 for shaft 24. One end of shaft 24, as shown in Fig. 3, projects outside of casing 10 and has secured adjacent its end a pulley 28. A belt 34 runs over pulleys 28 and 16. Journaled on shaft 24 is a rotatable clutch member or disc 30. Said clutch member 30 has a hub provided with a pulley or sprocket 31 over which runs a chain 32 also running over pulley or sprocket 21 of motor 18. A second rotatable clutch member 33 is splined to shaft 24 and is provided with a grooved hub 33*a*. A lever 35 is pivoted by a pivot 34 to a portion of bracket 25, the same having slots 35*a* intermediate its ends through which extends a clutch pin 36 extending into an annular groove in the hub 33*a*. Lever 35 extends rearwardly from shaft 24 and is pivotally connected by a link 37 to one arm of a bell crank lever 38 pivoted by a pivot 39 to a bracket 40 secured to the bottom of casing 10. The other arm of bell crank lever 38 is pivotally connected to a wire or rod 41 which will be later described. From the structure described it will be seen that oscillation of bell crank lever 38 will move clutch member 33 into or out of engagement with clutch member 30 so that shaft 24 will be rotated or not rotated respectively. Shaft 24 extends into a gear box 43 in which is disposed a beveled gear 44 splined to shaft 24. A collar 46 carried on shaft 24 engages the end of the hub of gear 44. Another collar 42 is secured to shaft 24 and a wedge member 45 will move between collars 42 and 46. Beveled gear 44 is adapted to move into and out of mesh with another beveled gear 47 secured to a shaft 48 extending at right angles to shaft 24 and journaled in ball bearings 49 disposed in a part of bearing bracket 25. A fan 50 disposed in the fan chamber 10*a* is secured to shaft 48. The wedge member 45 is of arcuate shape, as shown in Fig. 7, and the same has an arm 45*a* depending therefrom and pivotally connected to a small bracket 51 secured to the bottom of gear box 43. Said wedge has a lug 45*b* at its upper end to which is pivotally connected the lower end of a lever 52, which lever is mounted on a pivot 53 carried in a small bracket 54 secured to the top of gear box 43. Lever 52 has a handle portion extending vertically from pivot 53 and a coiled tension spring 56 is secured to a pin 55 in the upper portion of lever 52 and secured at its other end to an eyelet in the top of box 43**.

Journaled in a pair of arms of bracket 25 is a countershaft 60, the same being journaled in ball bearings 61 secured in said arms. A sprocket 62 is secured to countershaft 60 over which runs a chain 63 also running over a sprocket 64 secured on shaft 24. Sprockets 62 and 64 may be secured in any suitable manner, as by the pins 65. A third shaft 68 is journaled in ball bearings 69 secured in portions of bracket 25 and has journaled thereon a rotatable clutch member or disc 70 the hub of which has secured thereto a sprocket 71 over which runs a chain 72 also running over a sprocket 73 secured to shaft 60. Sprockets 71 and 73 may be secured in any suitable manner to their respective shafts, as by the pins 74. Splined to shaft 68 is a second rotatable clutch disc 76 having a hub **76*a* provided with an annular groove in which is disposed a pin 77 extending into a slot 78*a* of a lever 78 pivoted at one end to a portion of bracket 25 by a pivot 79. Lever 78 extends rearwardly of shaft 68 and is pivotally connected by a link 80 adjacent the end of one arm of a bell crank lever 82 pivoted by a pivot 83 to a small bracket 84 secured to the inner side of casing 10. The other arm of bell crank lever 82 has pivotally connected thereto a wire or rod 85 which passes through a guiding bracket 86 secured to the inner side of casing 10. The end of shaft 68 projects beyond the side of casing 10, as shown in Fig. 3, and has secured thereto a sprocket 87. A shaft 66 is journaled in bearings secured in the bottom of casing 10, which shaft has secured thereto a roller 67 on which casing 10 and the parts carried thereby are supported. It will be seen from Fig. 1 that the roller 67 is disposed substantially midway between the ends of casing 10. A sprocket 90 is secured to shaft 66 and a chain 91 runs over sprockets 87 and 90. Roller 67 is particularly constructed to get sufficient traction when the device is used as a snow plow. It comprises end plates or disks 67*a* having circumferentially spaced slots in their peripheries in which are disposed and secured the helically extending blades 67*b*. Said blades also project outwardly beyond said disks a small distance which in practice has been about one-half inch. Shaft 66 extends axially through disks 67*a* and is secured thereto. A roller is thus formed giving great traction. When moving on snow the snow will not pack between blades 67*b* but passes through the spaces therebetween. The blades 67*b* get excellent tractive force on the ground. When the device is used as a lawn mower or as a cleaning or gathering device two semi-cylindrical plates 67*c* will be placed over the bars 67*b* and will be held in place by screws 67*d* having their heads counter-sunk in members 67*c*. Screws 67*d* will be threaded into blocks or lugs 67*e* secured to the end plates or disks 67*a*** by welding.

A handle member 92 is secured to casing 10 and comprises side members **92*a* having flat portions 92*b* secured to the sides of casing 10 by bolts or rivets 93. Members 92*a* extend upwardly and rearwardly in a compound curve and are connected integrally with a cross horizontal member 92*c*. Mounted on the members 92*a* respectively are levers 94 and 95, said levers being pivotally connected adjacent their ends to the members 92*a*. The wire or rod 41 is pivotally connected to lever 94 some distance from its pivot. The wire or rod 85 is pivotally connected to lever 95 some distance from its pivot. Levers 94 and 95** will be formed as handles so as to be conveniently and comfortably gripped by the hand of the operator.

The front portion **10*b* of casing 10 has a curved lower front cover portion 10*k* of substantially 90 degrees in extent. A hinge 97 extends across said cover of portion 10*b* at the upper edge of portion 10*k* and said portion 10*k* can swing upwards about hinge 97. The remaining portion 10*m* of the cover can also swing upwardly about hinge 97. Portions 10*k* and 10*m* will be provided with suitable latches (not shown) at their free ends. Brackets 100 are secured at the front portion 10*b* at the inner sides of the side walls thereof and depend below portion 10*b*, the same being forked or bifurcated and having secured therein axle pins 101. Brackets 100 are secured by bolts or rivets 102. Caster wheels 103 are journaled on pins 101 respectively and form a support for the front part of casing 10. A housing 105 which preferably will be made of sheet metal is secured to the side of casing 10 and encloses pulleys 16 and 28 and belt 34. A housing 106 is secured to the opposite side of casing 10 and encloses sprockets or pulleys 87, 90 and chain 91. Housings 105 and 106 can be secured to the sides of casing 10** in any suitable manner, as by screws, so that said housings will be readily removable.

A second casing 110 of box-like form and substantially rectangular in vertical and horizontal cross section is supported on top of casing 10 and has at one corner thereof a depending spout or flange 111 which fits into opening 10*h*. Casing 110 also has depending from the sides thereof spaced plates 112 which are secured to the outer sides of casing 110 by bolts or rivets 113. Plates 112 fit closely along the sides of casing 10. A chute 114 extends upwardly in casing 110 in alinement with a spout 111 to a point some distance from the top of casing 110. A plate 115 curved through approximately 90 degrees and secured to the top and side of casing 110 is disposed over the top of chute 114. Casing 110 has an opening in its top substantially at the center thereof and an annular member 117 is secured about said opening, the same having a cylindrical flange **117*a* depending in casing 110. A cylindrical perforated plate or screen 118 has its upper end secured in flange 117*a*, as by welding, and depends below flange 117*a*. Member 118 comprises a bottom 118*a* also of perforated or screen material. Member 117 is adapted to receive and hold a stack member 120. Stack member 120 may be of any desired height. A portion or panel 110*a* forms part of one side of casing 110, which preferably will be the left-hand side looking forwardly. Said panel is hinged at one corner of said casing by hinges 121. Said panel 110*a* is provided with a handle 122 by means of which it may be swung to open or closed position. Said panel 110*a*** will be provided with a suitable latch (not shown).

In operation, when leaves, twigs and other extraneous matter is to be removed from a lawn or other portion of the ground, the motor 18 will be started. This will rotate clutch member 30. The operator now takes hold of the cross bar **92*c* and propels the device on its roller 89 to the desired point. If the material is to be conveyed into the casing 110 the operator will have swung lever 52 so that the wedge member 45 is disposed between the collars 42 and 46 and beveled gears 42 and 44 are in mesh. Spring 56 is extended and under tension when lever 52 is in vertical position and it tends to swing the top portion of said lever to one side or the other and hold it in either position. When lever 52 is swung to swing the wedge member 45 into operative position, it will be held in such position by spring 56. The operator now moves handle 94 toward bar 92*c* and this pulls upon wire or rod 41 and swings bell crank lever 38 and link 37 to move lever 35 and thus move clutch member 33 into engagement with clutch member 30. This causes rotation of shaft 24 and the member 15 is now rotated through pulley 28, belt 34 and pulley 16. Fan 50 is also rotated through the beveled gears 42 and 44. The operator now swings lever 95 toward bar 92*c* and this pulls upon wire or rod 85 and swings bell crank lever 82 and link 80 so that lever 78 is moved to cause clutch member 76 to engage clutch member 70. Counter-shaft 60 is constantly driven when shaft 24 is driven and the engagement of clutch members 76 and 70 now drives shaft 68 so that sprocket 87 is driven and the shaft 66 and roller 67 are driven through chain 91 and sprocket 90. The device is now propelled by power through the roller 67 and the operator has merely to guide the same. The device is now moved along the ground and any leaves, twigs, etc. will be engaged by the rotating member 15 and swung rearwardly and upwardly so that they are drawn into portion 10*b*, up casing 10 and into the fan chamber 10*a*. From fan chamber 10*a* the said material is directed upwardly through chute 114 and into the casing 110. Casing 110 constitutes an incinerator and the material preferably will be burned in casing 110. The smoke and other products of the combustion will pass through the sides and bottom of member 118 and will pass out through the stack 120. If the material is not to be burned in casing 110 panel 110*a* will be of screen or perforated material and the air can pass therethrough. Panel 110*a* can be swung open when desired to clean casing 110. The operator can disconnect the driving means for the roller 67 by moving lever 95 away from bar 92*c*. He can also disconnect the driving means for rotating member 15 by moving lever 94 away from bar 92*c*. The control of the power propulsion of the device and the control of the rotating member 15** are thus readily accessible to the operator.

The member 15 is made so that it can be readily replaced by said rotating cutter 89. With a lawn mower cutter used in place of the member 15 illustrated the device can be used as a power lawn mower and the grass clippings will be blown into casing 110. If it is desired to have the clippings drop back on the lawn, wedge member 45 will be moved to move the beveled gears 42 and 44 out of mesh and plate or panel 11 will be removed. The clippings can then drop through the opening **10*f*** and will be left on the lawn.

The device can also be used as a snow plow by using a rotating member having snow moving vanes thereon in place of the member 15 illustrated. When used as a snow plow, member 118 can be removed and the snow will be directed out of the fan chamber and can pass out of the stack 120. The top casing 110 could be removed if desired and the snow could then be directed out of a discharge chute connected over opening **10*h***.

From the above description it will be seen that I have provided a comparatively simple, very compact and easily operated device for gathering leaves and other undesirable material from a lawn or from the ground. The fan 50 creates a strong draft into the portion **10*b* so that all of the material is readily drawn into the fan chamber and discharged into the top casing 110. The material can be burned, as stated, within the casing 110. The motor and driving parts are all compactly carried in casing 10** and are arranged for convenient operation.

The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device of the class described having in combination, a casing, a roller at the bottom of said casing intermediate the ends thereof for supporting said casing, a fan chamber constituting a part of said casing and having an inlet opening and a discharge opening, said casing having a front portion communicating with said inlet opening, said portion having an opening in its bottom, a rotatable member in said front portion adapted to engage material supported on the ground, a motor mounted in said casing, a shaft driven from said motor, a pulley for driving said rotatable member, a pulley on said shaft, a belt connecting said pulleys, a rotatable clutch member journaled on said shaft, a shaft extending from said motor and driven by the same, a pulley on said shaft, a belt connecting said last mentioned pulley and said clutch member for driving said clutch member from said motor, a second clutch member secured to said shaft, a series of manually operated levers for moving said second clutch member into engagement with said first mentioned clutch member to rotate said shaft and rotatable member, means disengagingly connecting said roller to said shaft for driving said roller from said shaft, a beveled gear secured to said shaft, a second shaft at right angles to said shaft, a beveled gear secured to said second shaft, a fan disposed in said fan chamber secured to said second shaft, a series of connected levers manually operated for moving said beveled gears into and out of mesh with each other, and a second casing communicating with said outlet opening adapted to be used as an incinerator superposed on said first mentioned casing whereby material discharged into said second casing may be consumed therein.

2. A device of the class described having in combination, a casing, a roller at the bottom of said casing intermediate the ends thereof for supporting said casing, a fan chamber disposed in said casing and having an inlet opening and a discharge opening, said casing having a front portion communicating with said inlet opening, said portion having an opening at its lower side, a rotatable member in said front portion having end portions respectively disposed in the sides of said casing transversely thereof adapted to engage material supported on the ground and move said matter into said inlet opening, a motor mounted in said casing, a shaft journaled in said casing, means for connecting said rotatable member to said shaft for driving said rotatable member from said shaft, a fan in said fan chamber, means for connecting said fan to said shaft for driving said fan from said shaft, a counter-shaft journaled in said casing, means for connecting said countershaft to said first mentioned shaft for driving said counter-shaft from said first mentioned shaft, a third shaft journaled in said casing, a rotatable clutch member journaled on said third shaft, means connecting said clutch and said countershaft for driving said clutch member from said counter-shaft, a second clutch member secured to said third shaft, means for moving said second clutch member into engagement with said first mentioned clutch member for driving said third shaft or for moving said second clutch member out of engagement with said first mentioned clutch member, means for driving said roller from said third shaft, manually operated members for operating said second clutch member disposed in convenient position for manipulation by the operator and a second casing superposed on said first mentioned casing and communicating with said discharge opening, said second casing adapted to be used as an incinerator whereby material discharged therein may be consumed therein.

References Cited in the file of this patent

UNITED STATES PATENTS

| | | |
|---|---|---|
| 962,780 | Nelson | June 28, 1910 |
| 1,846,507 | Boring | Feb. 23, 1932 |
| 2,094,836 | Clark | Oct. 5, 1937 |
| 2,134,233 | McKone | Oct. 25, 1938 |
| 2,505,576 | Reitan | Apr. 25, 1950 |
| 2,538,643 | Gregory | Jan. 16, 1951 |